United States Patent [19]

Pine

[11] Patent Number: 4,567,152

[45] Date of Patent: Jan. 28, 1986

[54] CO-MATRIXED ZEOLITE AND P/ALUMINA

[75] Inventor: Lloyd A. Pine, Baton Rouge, La.

[73] Assignee: Exxon Research and Engineering Co., Florham Park, N.J.

[21] Appl. No.: 681,450

[22] Filed: Dec. 13, 1984

[51] Int. Cl.[4] .............................................. B01J 29/06
[52] U.S. Cl. ........................................ 502/64; 502/69; 502/214; 208/114; 208/120
[58] Field of Search ................ 208/120, 114, 120 MC; 502/214, 64, 69

[56] References Cited

U.S. PATENT DOCUMENTS

| | | | |
|---|---|---|---|
| 3,507,778 | 4/1970 | Gladrow et al. | 208/120 MC |
| 4,158,621 | 6/1979 | Swift et al. | 208/114 |
| 4,179,358 | 12/1979 | Swift et al. | 208/114 |
| 4,228,036 | 10/1980 | Swift et al. | 502/65 |
| 4,235,754 | 11/1980 | Chester | 502/73 |
| 4,243,556 | 1/1981 | Blanton, Jr. | 208/114 |
| 4,252,635 | 2/1981 | Blanton, Jr. | 208/120 MC |
| 4,259,212 | 3/1981 | Gladrow et al. | 502/65 |
| 4,277,373 | 7/1981 | Sawyer et al. | 502/64 |
| 4,283,309 | 8/1981 | Gladrow | 502/64 |
| 4,285,806 | 8/1981 | Mooi | 208/120 MC |
| 4,319,983 | 3/1982 | Yoo | 208/120 |
| 4,376,039 | 3/1983 | Gladrow et al. | 208/120 MC |
| 4,430,199 | 2/1984 | Durante et al. | 208/114 |
| 4,431,516 | 2/1984 | Baird et al. | 208/114 |
| 4,431,517 | 2/1984 | Nevitt et al. | 208/120 |
| 4,454,241 | 6/1984 | Pine et al. | 502/68 |
| 4,456,780 | 6/1984 | Young | 502/214 |
| 4,512,875 | 4/1985 | Long et al. | 208/114 |

FOREIGN PATENT DOCUMENTS 0150441  9/1982  Japan ................... 502/214

*Primary Examiner*—John Doll
*Assistant Examiner*—Lance Johnson
*Attorney, Agent, or Firm*—Marthe L. Gibbons

[57] ABSTRACT

A catalyst is provided which comprises a crystalline zeolite, discrete particles of phosphorus-containing alumina dispersed in a non-zeolitic inorganic oxide matrix. A catalytic cracking process utilizing the catalyst is also provided.

10 Claims, No Drawings

CO-MATRIXED ZEOLITE AND P/ALUMINA

BACKGROUND OF THE INVENTION

1. Field of the Invention

The present invention relates to a catalyst and its use in a catalytic cracking process. More particularly, the present invention relates to a cracking catalyst that minimizes coke production.

2. Description of Information Disclosures

Hydrocarbon cracking catalysts comprising a zeolite and discrete particles of alumina dispersed in an inorganic oxide matrix are known. See, for example, U.S. Pat. No. 4,283,309 and U.S. Pat. No. 4,259,212. Although the added alumina particles, which in themselves prior to being composited with the other components have relatively little cracking activity, the catalysts comprising the added alumina particles have increased activity, increased vanadium resistance, increased bottoms conversion and increased undesired coke production.

It has now been found that by treating the alumina particles with certain phosphorus compounds prior to compositing the alumina particles with the other catalysts or catalysts precursor components, the catalyst comprising the phosphorus-treated alumina particles has increased selectivity for naphtha components and produces less coke and gas. U.S. Pat. No. 4,454,241 discloses a phosphorus containing zeolitic catalyst made from a clay starting material. The catalyst is obtained by contacting a partially cation exchanged calcined zeolite-containing catalyst with a dihydrogen phosphate anion, e.g. ammonium hydrogen phosphate or dihydrogen phosphite anion.

U.S. Pat. No. 3,507,778 discloses a zeolite in combination with a phosphate promoted silica-magnesia catalyst for cracking petroleum fractions. Example 4 discloses an ammonium phosphate.

U.S. Pat. No. 4,228,036 discloses a cracking catalyst comprising an alumina-aluminum phosphate-silica matrix composited with a zeolite.

U.S. Pat. No. 4,179,358 discloses a cracking catalyst comprising a zeolite dispersed in a magnesia-alumina-aluminum phophate matrix.

U.S. Pat. No. 4,430,199 discloses passivation of contaminant metals on cracking catalysts by phosphorus addition. The phosphorus compound may be ammonium hydrogen phosphate. The phosphorus compound may be impregnated on an inert carrier such as calcined metakaolin clay that can be blended with the catalyst or added to the catalyst. See column 3, line 17 to 20 and column 10, lines 20 to 25.

SUMMARY OF THE INVENTION

In accordance with the invention, there is provided, a catalyst comprising: (a) a crystalline metallosilicate zeolite; (b) non-zeolitic inorganic oxide matrix; and (c) discrete particles of phosphorus-containing alumina dispersed in said matrix, said discrete particles having been prepared by contacting alumina with a phosphorus compound selected from the group consisting of phosphoric acid, a salt of phosphoric acid, phosphorous acid, a salt of phosphorous acid and mixtures thereof for a time sufficient to incorporate an effective amount of phosphorus in said alumina. Furthermore, in accordance with the invention, there is also provided a catalytic cracking process utilizing the above-stated catalyst.

DETAILED DESCRIPTION OF THE INVENTION

The catalyst of the invention comprises a zeolite, discrete particles of phosphorus-containing alumina and a non-zeolite inorganic oxide matrix.

THE ZEOLITE COMPONENT

Suitable zeolites for use as component of the catalyst of the present invention are any of the naturally occurring or synthetic crystalline zeolites. Examples of these zeolites include the zeolites designated by the Linde Division of Union Carbide by the letters X, Y, A, L (These zeolites are described in U.S. Pat. Nos. 2,882,244; 3,130,007; 3,882,243; and 3,216,789, respectively.); Naturally occurring crystalline zeolites such as faujasite, chabazite, erionite, mordenite, offretite, gmelinite, analcite, etc., ZSM-type zeolites such as ZSM-5 described in U.S. Pat. No. 3,702,886; ferrosilicates; zeolites such as those described in U.S. Pat. No. 4,238,318; borosilicate zeolites such as those described in Belgian Pat. No. 859656.

In general, the chemical formula of anhydrous crystalline metallosilicate zeolites expressed in terms of moles may be represented by the formula: $0.9\pm0.2M_{2/n}O:W_2O_3:Z\ SiO_2$, wherein m is selected from the group consisting of hydrogen, hydrogen precursors, monovalent, divalent and trivalent cations and mixtures thereof; n is the valence of the cation and Z is a number of at least 2, preferably at least 3, said value being dependent upon the particular type of zeolite. W, a metal in the anionic framework structure of the zeolite, may be aluminum, gallium, boron, iron, etc. Preferably, the zeolite is a crystalline alumino-silicate zeolite. More preferably, the zeolite is a Y-type zeolite. By "Y-type zeolite" is intended herein a zeolite having a silica to alumina mole ration of at least about 3, the structure of faujasite and uniform pore diameters ranging from about 6 to about 15 Angstroms. Most preferably, the zeolite has a unit cell size below 24.7 angstroms. For example, zeolites having unit cell size below about 24.5 angstroms are known as "stabilized" or "ultrastable" Y-type faujasite described in U.S. Pat. No. 3,293,192; U.S. Pat. Re 28,629 (Reissue of U.S. Pat. No. 3,402,996); U.S. Pat. No. 4,036,739; U.S. Pat. No. 3,781,199 and U.S. Pat. No. 4,036,739. The zeolites as produced or found in nature normally contain an alkali metal cation such as sodium and/or potassium and/or an alkaline earth metal cation such as calcium and magnesium. The zeolites differ from each other in structure, composition and ratio of silica to metal oxide contained in the crystal lattice. For use as hydrocarbon conversion catalyst component, it is usually necessary to decrease the alkali metal content of the crystalline metallosilicate zeolite to a content of less than 10 wt.%, preferably less than 6 wt.%, more preferably less than 1 wt.%. The alkali metal content reduction, as is known in the art, may be conducted by exchange with one or more cations selected from groups IB through VIII metals of the Periodic Table of Elements. The Periodic Table of Elements referred to herein is given in *Handbook of Chemistry and Physics*, published by the Chemical Rubber Publishing Company, Cleveland, Ohio, 45th Edition, 1964, as well as with a hydrogen cation or hydrogen precursor (e.g. $NH_4^+$) capable of conversion to the hydrogen cation. Preferred cations include rare earth metals, calcium, magnesium, hydrogen and mixtures thereof. Ion exchange methods are well-known in the art and are described, for example, in U.S. Pat. No. 3,140,249; U.S. Pat. No. 3,140,251 and U.S. Pat. No. 3,142,353, the teachings of which are hereby incorporated by reference. The concentration of hydrogen cation in the finished zeolite will be that concentration equivalent to the difference between the theoretical cation concentration of the particular zeolite and the amount of cation present in the form of exchanged metal cation and a residual alkali metal cation. The final zeolite may be composited with other catalytic metal components, such as metals of Groups IIA, IIIA, IB, IIB, IIIB, IVB, VIII of the Periodic Table of Elements by vapor phase deposition, impregnation, etc. The particle size of the zeolite component may range from about 0.1 to 10 microns, preferably from about 0.5 to 3 microns. Suitable amounts of the zeolite component in the total catalyst will range from about 1 to about 60, preferably from about 1 to about 40, more preferably from about 5 to 40 wt.% based on the total catalyst.

THE ALUMINA COMPONENT

The alumina component of the catalyst of the present invention is present as discrete particles of phosphorus-treated alumina dispersed in the matrix. Suitable alumina starting material for the phosphorus treatment of the present invention is alumina having a total surface area, as measured by the method of Brunauer, Emmett and Teller (BET) greater than 50 square meters per gram ($M^2/g$), preferably greater than 140 $M^2/g$, for example, from about 145 to 400 $M^2/g$. Preferably the pore volume (BET) of the alumina will be greater than 0.35 cc/g. The alumina may comprise a minor amount of silica such as suitably from about 0.1 to 15 weight percent, preferably from about 0.1 to 6 weight percent silica, based on the weight of the alumina component of the particles. The average particle size of the alumina particles will generally be less than 10 microns, preferably less than 3 microns. Preferably, the porous alumina will be bulk alumina. The term "bulk" with reference to the alumina is intended herein to designate a material which has been preformed and placed in a physical form such that its surface area and porous structure are stabilized so that when it is added to an inorganic matrix containing residual soluble salts, the salts will not alter the surface and pore characteristics measurably. The initial alumina particles are contacted with a phosphorus compound for a time sufficient to composite phosphorus with the alumina particles. Suitable phosphorus compounds include phosphoric acid ($H_3PO_4$), phosphorous acid ($H_3PO_3$), salts of phosphoric acid, salts of phosphorous acid and mixtures thereof. Although any soluble salt of phosphoric acid or phosphorous acid, such as alkali metal salts and ammonium salts may be used, it is preferable to use ammonium salts. Preferred phosphorus-containing compounds are monoammonium phosphate ($NH_4$) $H_2PO_4$, diammonium phosphate ($NH_4$)$_2HPO_3$ monoammonium phosphite ($NH_4$)$H_2PO_3$, diammonium phosphite ($NH_4$)$_2HPO_3$, and mixtures thereof. Suitable amounts of phosphorus to be incorporated with the alumina include at least about 0.1 wt.%, generally, from about 0.1 to 5 wt.%, preferably at least about 0.2 wt.%, more preferably from about 0.5 to 5.0 wt.%, calculated as elemental phosphorus, based on the weight of the alumina. Contact of the alumina with a liquid medium (such as water) comprising the phosphorus compound is suitably conducted at a pH ranging from about 2.0 to about 8.0. Suitable concentrations of the phosphorus compound in the liquid medium may range from about 0.05 to about 5 wt.%. Treating time and temperatures are not critical and may range from about ambient temperature, that is, from about 60° F. to about 250° F. The phosphorus-treated alumina particles are recovered from the liquid medium (dried for example, at a temperature of about 800° F. for 2 hours). The resulting phosphorus-treated alumina particles may suitably be present in the catalyst of the present invention in amounts ranging from about 5 to about 40 wt.%, preferably from about 10 to about 30 wt.%, based on a total catalyst.

THE INORGANIC OXIDE MATRIX COMPONENT

The inorganic oxide matrices suitable as component of catalysts of the present invention are non-zeolitic inorganic oxides, such as silica, alumina, silica-alumina, magnesia, boria, titania, zirconia, and mixtures thereof. The matrices may include one or more of various known clays, such as montmorillonite, kaolin, halloysite, bentonite, attapulgite, and the like. Preferably, the inorganic oxide is a silica-containing material comprising a major amount of silica and a minor amount of an oxide of at least one metal of Group IIA, IIIA, IVB of the Periodic Table of Elements. Most preferably, the inorganic oxide will be a non-zelitic silica-alumina. Suitable matrices include the type of matrices prepared from a sol such as described in U.S. Pat. No. 3,867,308; U.S. Pat. No. 3,957,689 and U.S. Pat. No. 4,458,023. The matrix component may be present in the catalyst of the present invention in an amount ranging from about 40 to about 99 weight percent, preferably from about 50 to about 80 wt.% based on the total catalyst. It is also within the scope of the invention to incorporate in the catalyst other materials to be employed in cracking catalysts such as various other types of zeolites, clays, carbon monoxide oxidation promoters, etc.

CATALYST PREPARATION

The catalyst of the present invention may be prepared by any one of several methods. The preferred method of preparing one of the catalysts of the present invention, that is, a catalyst comprising a silica-alumina matrix and phosphorus-treated alumina particles dispersed in the matrix, is to react sodium silicate with a solution of sulfuric acid and aluminum sulfate to form a silica-alumina sol. Separately, the bulk alumina is made, for example, by reacting solutions of sodium aluminate and aluminum sulfate under suitable conditions, aging the slurry to give the desired pore properties of the alumina, filtering, drying, reslurrying in water to remove sodium and sulfate ions and drying to reduce the volatile matter content to less than 15 wt.%. The alumina is calcined and then treated with an appropriate phosphorus compound such as a monoammonium phosphate solution. The phosphate-treated alumina particles are recovered from the treating solution and slurried in water and blended in proper amounts with a slurry of impure silica-alumina sol and clay. The zeolite component is added to this blend. Preferably, the zeolite is a Y-type zeolite having a unit cell size below about 24.7 Angstroms preferably below 24.5 angstroms. A sufficient amount of each component is utilized to give the desired final composition. The resulting mixture is then spray dried to produce dry solids. The dry solids are subsequently reslurried in water and washed substantially free of undesired soluble salts. The catalyst is then dried to a residual water content of less than about 15 wt.%. The dried catalyst is recovered. The catalyst of the present invention is particularly suited for catalytic cracking of hydrocarbons.

Catalytic cracking with the catalysts of the present invention can be conducted in any conventional catalytic cracking manner. Suitable catalytic cracking conditions include a temperature ranging from about 700° to about 1,300° F. and a pressure ranging from about subatmospheric to several hundreds of atmospheres, typically from about atmospheric to about 100 psig. The process may be carried out in a fixed bed, moving bed, ebullating bed, slurry, transfer line, or fluidized bed operation. The catalyst of the present invention can be used to convert any of the conventional hydrocarbon feeds used in catalytic cracking, that is, it can be used to crack naphthas, gas oils and residual oils having a high content of metal contaminants. It is especially suited for cracking hydrocarbons boiling in the gas oil range, that is, hydrocarbons oils having an atmospheric pressure boiling point ranging from about 450° to about 1,100° F. to yield products having a lower boiling point while producing less coke and gas.

DESCRIPTION OF THE PREFERRED EMBODIMENT

The following examples are presented to illustrate the invention.

Catalysts of the invention and comparative catalysts were prepared and tested for cracking activity in a standard microactivity test (MAT) described in Oil and Gas Journal, 1966 vol. 64, pages 7, 84, 85 and Nov. 22, 1971 pages 60–68. Two hydrocarbonaceous oil feedstocks were used, herein designated "Feedstock No. 1" and Feedstock No. 2". The characteristics of these feedstocks are given in the following table:

|  | Feedstock No. 1 | Feedstock No. 2 |
|---|---|---|
| gravity, °API at 60° F. | 22.5 | 26.2 |
| Distillation |  |  |
| IBP | 710 | 583 |
| 5% | 739 | 594 |
| 50% | 853 | 704 |
| 95% | 990 | 786 |
| FBP | 1025 | 802 |

EXAMPLE 1

A solution was made by dissolving 1016 gms of monoammonium phosphate (MAP) in 60 lbs. of water. 8.4 lbs of alumina that had been previously calcined for 4 hours at 538° C., was slurried into the MAP solution. The treatment is equivalent to about 120 gms of MAP per pound of alumina. The mixture was stirred for 2 hours at room temperature and then filtered. The wet cake was rinsed with two one-gallon portions of hot water and then dried overnight at about 120° C. The dried product was then calcined for two hours at 427° C. The phosphate treated alumina contained 3.64 wt% P. The treated alumina was put into a catalyst formulation using the following procedure: a sodium silicate solution was made by diluting 13.9 lbs of sodium silicate with 18.9 lbs of water. An alum solution was made by dissolving 3217 gms of alum, containing the equivalent of 15.9% $Al_2O_3$, in 8.9 lbs $H_2O$. The alum solution was then mixed with 24.2 lbs of 20 wt% sulfuric acid solution. A silica-alumina sol was made by mixing the sodium silicate solution with enough of the acid-alum solution to produce a sol having a pH of 3.0. 8.0 lbs of the phosphate treated alumina and 938 gms of ultrastable Y zeolite was mixed with 30 lbs of water. The ultrastable Y zeolite used was Davison's grade Z-14 US. The pH of the zeolite and alumina slurry was adjusted to about 3.4 with 20% sulfuric acid. The silica-alumina sol was cooled and diluted by adding 7.0 lbs of ice. 2990 gms of kaolin clay was then added to the sol. The zeolite and alumina slurry was then added to the clay-sol slurry and the mixture immediately spray dried. The spray dried catalyst was washed once with water and then twice with a 3.2 wt% ammonium sulfate solution that contained added $NH_4OH$ to raise the pH to 8.0. After a final water wash the catalyst was dried overnight at about 120° C. The final composition of the catalyst was 10% ultrastable Y zeolite, 40% phosphate treated alumina, and 30% clay in a silica-alumina binder. This catalyst is designated herein "Catalyst A" and is a catalyst of the invention.

EXAMPLE 2

Catalyst B, which is not a catalyst of the present invention, was made exactly the same way as Catalyst A except the alumina was used as received from the manufacturer rather than being treated with monoammonium phosphate.

EXAMPLE 3

Catalysts A and B were deactivated by steaming for 16 hours at 760° C. and then evaluated using the microactivity test. The results given in Table I show the coke reduction resulting from phosphate treating.

TABLE I

| Catalyst | A | B |
|---|---|---|
| Alumina Inspections |  |  |
| P, Wt % | 3.64 | 0 |
| Surface Area, m²/g | 184 | 288 |
| Pore Volume, cc/g | 0.69 | — |
| MAT Conversion, LV % | 57.0 | 59.0 |
| Coke, Wt % on Feed | 2.26 | 3.63 |
| Specific Coke | 1.70 | 2.54 |

By "specific coke" is intended herein (coke/1/1−X) wherein X is the fraction of feed converted to materials boiling below 400° F.

EXAMPLE 4

Catalysts C, D, E, F and G were made to determine the concentration range over which monoammonium phosphate treating would be effective. The procedure was exactly the same as for catalyst A except that the amount of MAP salt used in the treating solution was varied. The washed and dried catalysts were deactivated by steaming for 16 hours at 760° C. and then evaluated using the micro-activity test. The results, given in Table II, show that MAP concentrations as low as 6.7 gms per pound of dry alumina resulted in incorporating 0.19 wt% P in the alumina and significantly reduced the specific coke yield of catalysts, compared to catalyst B. The phosphorus content of the aluminas used in catalysts D and E was not measured.

TABLE II

| Catalyst | C | D | E | F | G |
|---|---|---|---|---|---|
| MAP Concentrations Used, gms/lb $Al_2O_3$ | 240 | 60 | 30 | 12 | 6.7 |
| Treated Alumina Inspections | 4.71 | — | — | 0.42 | 0.19 |

TABLE II-continued

| Catalyst | C | D | E | F | G |
|---|---|---|---|---|---|
| P, wt % | | | | | |
| BET Surface Area, m²/g | 171 | — | — | — | 250 |
| Pore Volume, cc/g | 0.71 | — | — | — | 0.86 |
| MAT Results | | | | | |
| Conversion, LV % | 52.1 | 57.5 | 55.2 | 56.1 | 57.5 |
| Coke, Wt % on Feed | 1.78 | 2.35 | 2.24 | 2.41 | 2.58 |
| Specific Coke Yield | 1.64 | 1.74 | 1.82 | 1.89 | 1.91 |

Catalysts C, D, E, F and G are catalysts of the invention.

It should be noted that in examples 1 to 4, the feedstock used was Feedstock No. 1.

EXAMPLE 5

Catalysts M, O and P were made to test whether phosphate compounds other than MAP were effective for lowering coke. A commercially available alumina was pre-calcined 4 hours at 538° C. prior to being treated with the phosphate solution and for 2 hours at 427° C. after being treated. The concentration of these different phosphate reagents is expressed as the molar equivalent of MAP. The data with the different reagents and the MAT evaluation of the steamed catalysts are given in Table III.

TABLE III

| Catalyst | M | O | P |
|---|---|---|---|
| Reagent | $(NH_4)_2HPO_4$ | $H_3PO_3$ | $(NH_4)H_2PO_3$ |
| Concentration, gms/lb $Al_2O_3$[1] | 30 | 60 | 60 |
| Treated Alumina Inspections | | | |
| P, Wt % | 0.40 | 1.69 | 1.34 |
| Surface Area, m²/g | — | 235 | 235 |
| Pore Vol., cc/g | — | 80 | 0.86 |
| MAT Results | | | |
| Conversion, LV % | 56.2 | 56.7 | 58.8 |
| Coke, Wt % | 2.93 | 1.93 | 2.71 |
| Specific Coke Yield | 2.28 | 1.47 | 1.90 |

[1]MAP equivalent basis

Catalysts M, O and P are catalysts of the invention.

EXAMPLE 6

All of the catalysts in examples 1 through 5 were prepared using the same grade of alumina. To show that the phosphate treatment is effective in lowering specific coke yields, catalysts were made with other aluminas. Catalysts Q and R were made with another alumina and catalysts S and T were made with still another grade of alumina. The MAP treatment procedure for the aluminas in catalysts R and T was the same as that used for catalyst D. The composition of these catalysts were all 10% USY, 40% alumina, in a silicaclay matrix. The term "USY" is used herein to designate an ultrastable Y type zeolite.

TABLE IV

| Catalyst | Q | R | S | T |
|---|---|---|---|---|
| Alumina | — | — | — | — |
| MAP Treated Alumina | No | Yes | No | Yes |
| Inspections | | | | |
| P, Wt % | 0 | 2.76 | 0 | 2.76 |
| BET Surface Area, m²/g | 266 | 159 | 304 | 194 |
| Pore Volume, cc/g | 0.51 | 0.31 | 0.80 | 0.74 |
| MAT Results | | | | |
| Conversion, LV % | 57.0 | 51.3 | 55.9[1] | 53.5[1] |
| Coke, Wt % on Feed | 3.11 | 2.06 | 1.74 | 1.12 |
| Specific Coke Yield | 2.35 | 1.96 | 1.37 | 0.97 |

[1]Feedstock No. 2

Catalysts R and T are catalysts of the invention.
Catalysts Q and S are not catalysts of the invention.

EXAMPLE 7

Additional catalysts were made utilizing silica-clay matrix made from a silica sol as described in U.S. Pat. No. 3,957,689, the teachings of which are hereby incorporated by reference. The catalysts were tested in the microactivity test using Feedstock No. 2. The composition of the catalysts were 10% USY, 40% $Al_2O_3$, in a silica-clay matrix.

TABLE V

| Catalyst | U | V | W | XX |
|---|---|---|---|---|
| $Al_2O_3$ Treatment | None | None | $H_3PO_3$ | $H_3PO_4$ |
| MAP Equivalent Basis, gms/lb $Al_2O_3$ | 0 | 0 | 60 | 60 |
| Steamed Catalyst | | | | |
| BET Surface Area, m²/g | 144 | 143 | 102 | 129 |
| MAT Conv., LV % | 58.0 | 54.2 | 50.7 | 55.8 |
| Coke Yield, Wt % | 2.16 | 2.04 | .804 | 1.35 |
| Specific Coke Yield | 1.56 | 1.72 | .78 | 1.07 |
| Alumina Inspections | | | | |
| Surface Area, m²/g | 288 | 288 | 228 | 174 |
| Pore Vol., cc/g | .85 | .85 | .84 | .72 |
| P, Wt % | 0 | 0 | 2.5 | 3.96 |

Catalysts W and XX are catalysts of the invention.
Catalysts U and V are not catalysts of the invention.

EXAMPLE 8

This data set shows that the MAP treatment is effective with silica containing aluminas. The alumina was a commercial sample containing about 5.0 wt% $SiO_2$. The MAP treatment was with 120 gms MAP/lb of $Al_2O_3$ using the same calcining procedure as for catalyst A. The matrix was silica-clay.

TABLE VI

| Catalyst Number | YY | Z |
|---|---|---|
| $Al_2O_3$ Treatment | None | 120 gms MAP/lb $Al_2O_3$ |
| Steamed Catalyst | | |
| Surface Area, m²/g | 266 | 217 |
| Pore Vol., cc/g | .70 | .60 |
| P, Wt % | 0 | 4.34 |
| Steamed Catalyst | | |
| Surface Area, m²/g | 167 | 127 |
| MAT Conv., LV % | 62.3 | 57.9 |
| Coke Yield, Wt % | 2.36 | 1.44 |
| Specific Coke Yield | 1.43 | 1.05 |

Catalyst Z is a catalyst of the invention.
Catalyst YY is not a catalyst of the invention.

EXAMPLE 9

This example shows MAP treated alumina with a rare earth containing zeolite. The catalysts contained 10% CREY and 40% $Al_2O_3$ in a silica-clay matrix prepared and described in U.S. Pat. No. 3,957,689, the teachings of which are hereby incorporated by reference. The MAP $Al_2O_3$ was made the same way as for catalyst "A" and contained 3.39 wt% phosphorus. The term "CREY" is used to designate a calcined rare earth-exchanged zeolite Y.

TABLE VII

| Catalyst | AA | BB |
|---|---|---|
| $Al_2O_3$ Treatment | None | 120 gms MAP/lb $Al_2O_3$ |
| Surface Area, $m^2/g$ | 140 | 124 |
| MAT Conv., LV % | 70.6 | 69.9 |
| Coke Yield, Wt % | 2.30 | 1.89 |
| Specific Coke Yield | 0.958 | 0.814 |

Catalyst BB is a catalyst of the invention.
Catalyst AA is not a catalyst of the invention.

EXAMPLE 10

This is an example of a catalyst containing a MAP treated alumina in an alumina-clay matrix prepared from aluminum chlorhydrol and clay as described in U.S. Pat. No. 4,458,023, the teachings of which are hereby incorporated by reference. The alumina was treated the same way as for catalyst A and contained 2.47 wt% phosphorus. The catalyst comprised 10% USY, 40% $Al_2O_3$ and an alumina-clay matrix.

TABLE VIII

| Catalyst | CC | DD |
|---|---|---|
| $Al_2O_3$ Treatment Steamed Catalyst | None | 120 gms MAP/lb $Al_2O_3$ |
| Surface Area, $m^2/g$ | 122 | 92 |
| MAT Conv., LV % | 55.6 | 52.8 |
| Coke Yield, Wt % | 1.94 | 1.39 |
| Specific Coke Yield | 1.55 | 1.24 |

Catalyst DD is a catalyst of the invention.
Catalyst CC is not a catalyst of the invention.

EXAMPLE 11 (Comparative Example)

A catalyst, herein designated "EE", containing 10% ultrastable Y zeolite 40%, MAP treated clay and 50 percent of the silica-clay matrix made from a silica sol as described in U.S. Pat. No. 3,957,689 was prepared. The clay additive was MAP treated at the same conditions as for the alumina used in catalyst B. The MAP treated clay had the following characteristics:

| BET surface area, $m^2/g$ | 19.00 |
|---|---|
| pore volume, cc/g | 0.25 |
| p, wt % | 0.23 |

The steamed catalyst having a BET surface area of 37 $m^2/g$ was tested in the microactivity test, MAT using feedstock No. 2. The results of the test were as follows:

| MAT Conversion, LV % | 22.4 |
|---|---|
| coke yield, wt % | 0.512 |
| specific coke yield | 1.77 |

As can be seen, catalyst EE, which is not a catalyst of the invention, did not significantly decrease the coke yield even though the clay additive was MAP treated.

EXAMPLE 12

A catalyst, herein designated catalyst FF, contained 25% ultrastable Y zeolite and 75% of the silica-clay matrix made from a silica sol as described in U.S. Pat. No. 3,957,689. The steamed catalyst had a BET surface area of 108 $m^2/g$. Catalyst FF was tested in a microactivity test MAT using feedstock No. 2. The results of the test were as follows:

| MAT Conversion, LV % | 48.8 |
|---|---|
| coke yield, wt % | 0.789 |
| specific coke yield | 0.83 |

Catalyst FF is not a catalyst of the invention. It is a reference catalyst which shows the coke yield of a catalyst that does not have an alumina additive.

What is claimed is:

1. A catalyst comprising: (a) a crystalline metallosilicate zeolite; (b) a non-zeolitic inorganic oxide matrix, said zeolite being dispersed in said matrix and (c) discrete particles of phosphorus-containing alumina also dispersed in said matrix, said discrete particles having been prepared by contacting alumina having a BET surface area greater than 50 square meters per gram with a phosphorus compound selected from the group consisting of phosphoric acid, a salt of phosphoric acid, phosphorous acid, a salt of phosphorous acid, and mixtures thereof, for a time sufficient to incorporate an effective amount of phosphorus in said alumina.

2. The catalyst of claim 1 wherein said phosphorus compound is selected from the group consisting of an ammonium salt of phosphoric acid, an ammonium salt of phosphorous acid, and mixtures thereof.

3. The catalyst of claim 1 wherein said phosphorus is present in said discrete particles of alumina in an amount of at least about 0.1 wt.%, based on the weight of said discrete particles of alumina, calculated as elemental phosphorus.

4. The catalyst of claim 1 wherein said phosphorus is present in said discrete particles of alumina in an amount ranging from about 0.2 to about 5.0 wt.%, calculated as elemental phosphorus based on the weight of said discrete particles of alumina.

5. The catalyst of claim 1 wherein said catalyst comprises from about 0.04 to about 2.0 wt.% of said phosphorus.

6. The catalyst of claim 1 wherein said zeolite is a Y-type zeolite having a unit cell size below about 24.7 angstroms.

7. The catalyst of claim 1 wherein said zeolite is an ultrastable Y zeolite have a unit cell size below about 24.5 Angstroms.

8. The catalyst of claim 1 wherein said matrix is selected from the group consisting of silica, alumina, silica-alumina, magnesia, zirconia, titania, boria, chromia and mixtures thereof.

9. The catalyst of claim 1 wherein said matrix comprises silica-alumina.

10. The catalyst of claim 1 wherein said zeolite is an ultrastable Y-type zeolite present in an amount ranging from about 1 to about 40 wt.%, said discrete particles of phosphorus-containing alumina being present in an amount ranging from about 5 to about 40 wt.%, said phosphorus being present in an amount ranging from about 0.5 to about 5.0 wt.%, based on said discrete particles of alumina, and wherein said matrix comprises silica-alumina.

* * * * *